Figures 1, 2:
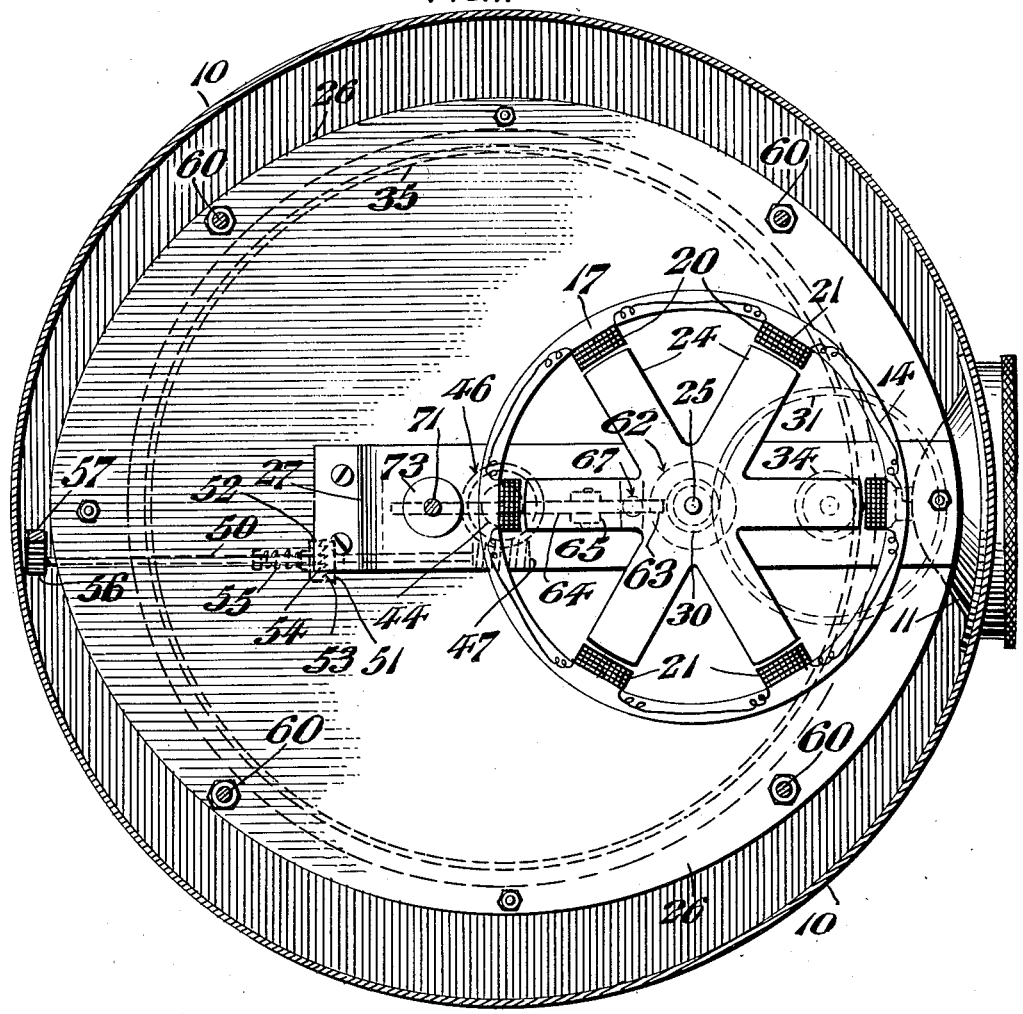

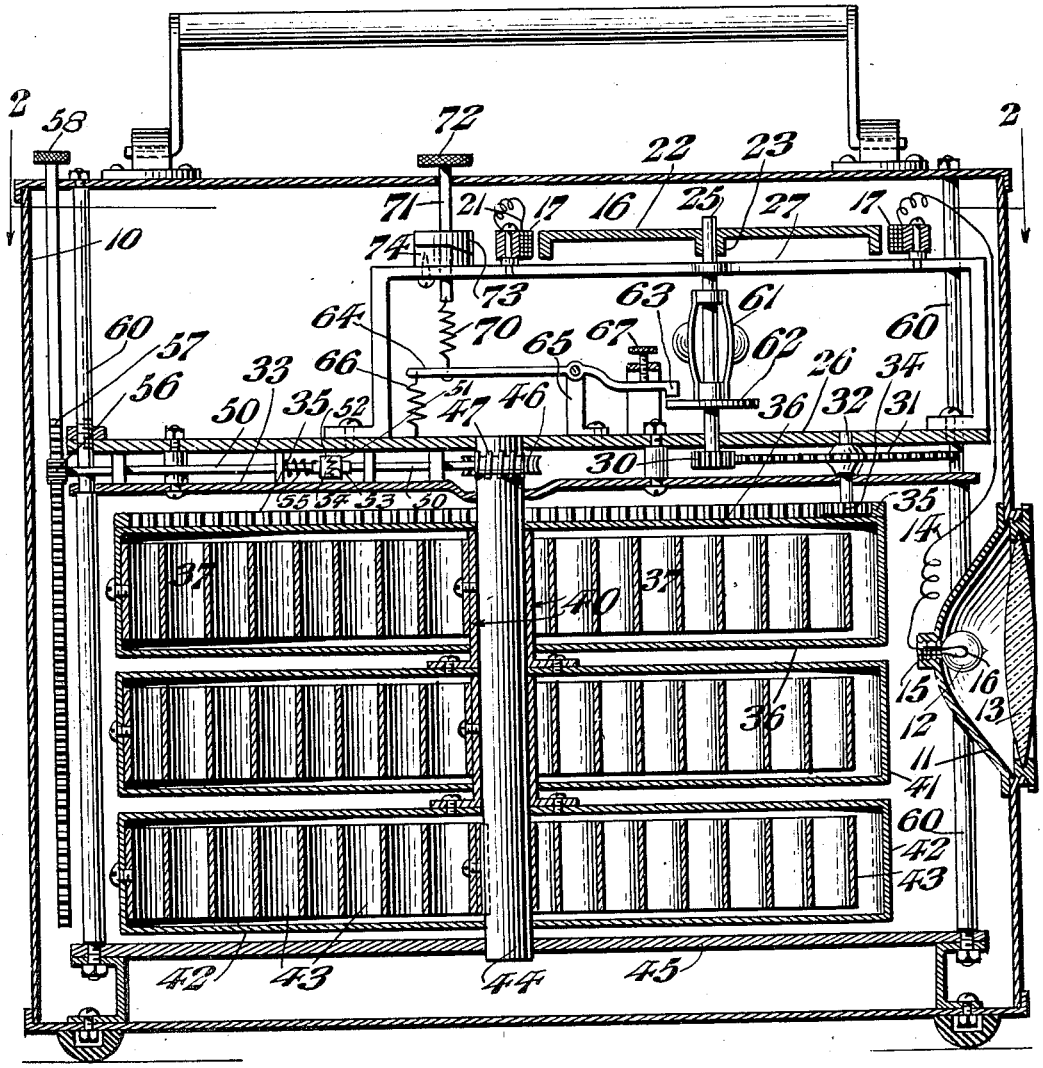

Oct. 23, 1923.

C. B. BURNET 1,471,682

PORTABLE ELECTRIC LANTERN

Filed June 25, 1920    2 Sheets-Sheet 2

ON LINE 2-2.

INVENTOR
Carter B. Burnet,
BY
Robert M. Barr
ATTORNEY

Patented Oct. 23, 1923.

1,471,682

UNITED STATES PATENT OFFICE.

CARTER B. BURNET, OF SOUTH NORFOLK, VIRGINIA, ASSIGNOR OF ONE-HALF TO WILLIAM W. SLAYMAKER, OF PHILADELPHIA, PENNSYLVANIA.

PORTABLE ELECTRIC LANTERN.

Application filed June 25, 1920. Serial No. 391,658.

*To all whom it may concern:*

Be it known that I, CARTER B. BURNET, a citizen of the United States, and a resident of South Norfolk, county of Norfolk, State of Virginia, have invented certain new and useful Improvements in Portable Electric Lanterns, of which the following is a specification.

Some of the objects of the present invention are to provide an improved electric lantern; to provide a portable electric lantern arranged to be operated by a generator; to provide a lantern arranged to be lighted by a generator driven by a motor included as a part of a complete lighting unit; to provide an improved generator for portable electric lights; to provide an improved motor and speed regulator for use with a generator of a portable electric lantern; and to provide other improvements as will hereinafter appear.

In the accompanying drawings, Fig. 1 represents a sectional elevation of an electric lantern embodying one form of the present invention; and Fig. 2 represents a section on line 2—2 of Fig. 1.

Referring to the drawings, one form of the present invention consists of a containing case 10, of suitable shape and size for convenience and portability, having a light reflector 11 fixed to a side thereof and arranged about an electric lamp 12 of standard construction, the latter being suitably protected by a suitable lens 13 or any other transparent face.

For the purpose of energizing the lamp 12, a conductor 14 leads from the center contact of the electric bulb, which has its base 15 grounded, and is connected to one terminal of a generator 16, the other terminal of which is grounded for the return from the bulb of the lamp 12. In the present construction the generator 16 has a fixed armature 17 preferably built up of a number of soft iron laminations which are stamped to form projections 20 for carrying the windings 21. The windings 21, as here shown, are connected in series with each other and with the lamp 12, but may be of any suitable form of winding, whereby closing of the circuit causes the lamp 12 to light. The armature 17 is arranged to encircle a rotatable field formed, preferably, of a number of radially arranged strips 22, which as permanently magnetized and radiate from a common hub 23 to bring the respective pole pieces into juxtaposed relation to the windings on the armature 17. The hub 23 is rigidly fastened to a rotatable spindle 25 having a bearing at one end in a transversely disposed fixed plate 26 and a bearing at the other end in a frame 27, fast to the plate 26, or other fixed part. It will be understood that the invention is not limited to the exact construction and arrangement of parts as here shown by way of example. From the foregoing it will be apparent that a generator has been employed in which brushes, a commutator and slip rings are eliminated.

As a means for rotating the spindle 25 at a relatively high speed, the spindle 25 has a pinion 30 fast thereon and in mesh with a gear 31 which is keyed to a stud shaft 32 journalled in the plate 26 and also in a cap disc 33. This shaft 32 carries a pinion 34, which is fast thereon, meshing with an internal gear 35 which is arranged to be driven by any suitable type of motor. In the present form of the invention a spring motor of barrel construction is shown by way of example and the gear 35 is made fast to one face of an end barrel 36 which is arranged to be rotated by the action of a coil spring 37 fixed at one end to the barrel 36 and at its other end to a sleeve 40 rigidly fixed to a second barrel 41. Each motor unit consists of a barrel, a spring and a sleeve and there may be as many units as are required to give the required duration of rotation. In the present construction three such units are shown connected in succession, barrel to spring, spring to sleeve, and sleeve to the next barrel, until the end barrel 42 is reached where its contained spring 43 is connected from the barrel 42 to a winding shaft 44 which passes freely through the several sleeves, being journalled at its ends respectively in the cap disc 33 and a second cap disc 45.

In order to wind the shaft 44, a worm wheel 46 is fast thereon and meshes with a worm 47 fixed to a split shaft 50, the abutting ends of which are respectively fitted with discs 51 and 52, the former being fixed to its shaft part and having a plurality of ratchet teeth 53, and the latter being keyed but movable axially on its shaft part and having ratchet teeth 54 arranged to clutch with the teeth 53. The movable disc 52 is normally held in clutching engagement by a coil spring 55 but the arrangement is such that the clutch is released when the winding mechanism is caused to move on the non-winding stroke. The outer end of the shaft 50 carries a pinion 56 in mesh with a reciprocable rack 57, which is mounted for free linear movement in the case 10 and has one end projecting at a convenient location where it terminates in and may be operated by a hand knob 58. Any other suitable means, however, may be employed for winding the shaft 44.

For supporting and rigidly maintaining the motor in operative position, suitable stay bolts 60 are provided which pass through the discs 33, 45 and plate 26, being rigidly fastened thereto and to the case 10.

For the purpose of controlling the speed of the driven spindle 25 a governor 61 of any well known form may be employed which is arranged to control a movable disc 62 to bring the latter into braking engagement with a friction member 63. The friction member 63 is carried by a pivoted arm 64, suitably mounted on a rigid bracket 65, and a spring 66 serves to hold the friction member 63 normally out of contact with the disc 61. An adjusting screw 67 is mounted to set the operative position of the member 63 with respect to the governor controlled disc 62.

For causing the friction member 63 to act as a brake for stopping purposes the lever arm 64 is connected by a spring 70 with a rod 71 which passes freely through the frame 27 and the case 10 and terminates in a knurled thumb nut 72 by means of which the rod 71 can be turned as desired. The rod 71 has a movable cam part 73 fast thereon having a bevelled portion arranged in close proximity to a fixed cam part 74, correspondingly bevelled, which is secured to the frame 27. The bevelled portions give a cam effect so that when the rod 71 is turned it receives a linear motion as well, whereby the lever arm 64 is tilted to bring the friction member 63 into braking engagement with the disc 62. When the device is not in operation the rod 71 is held by the cam parts 73 and 74 to brake the generator spindle 26, and when released for starting purposes the spring 66 tilts the arm 64 to release the friction member 63.

In the operation of the light the motor may be wound by reciprocating the hand operated rack 57, the movement of which causes the shaft 50 to rotate the winding shaft 44 and simultaneously wind the springs within the spring barrels. With the motor wound the device may be operated by turning the thumb nut 72 to release the arm 64 whereupon the driven shaft 25 is released to respond to the action of the spring motor. The motion transmitting gearing is so proportioned as to rotate the field 22 at a relatively high speed between the armature coils 17 and thereby generate sufficient current to light the lamp 12 and give a bright light sufficient for the purpose intended.

The speed of the generator shaft 25 will be kept uniform throughout the useful range of spring tension by means of the governor, which functions by centrifugal action causing the disc 61 to be brought into contact with the brake member 63 and due to this braking effect the speed is kept uniform until the spring tension is no longer sufficient to overcome the resistance due to the load, at which time the spring motor is rewound.

When through using the light the thumb nut 72 is turned in a direction to cause the movable cam 73 to ride upward upon the fixed cam 74 thereby forcing the rod 71 outwardly and tilting the arm 64 to bring the friction member 63 into engagement with the disc 62 so that the motor is brought to rest.

While but one of the many forms of the present invention has been here shown by way of example, it will be understood that the invention is not to be limited thereby as it might be embodied in various forms without departing from the invention or the scope of the appended claims.

Having thus described my invention, I claim:

1. In a portable device of the character described, the combination of a casing, a motor located within the lower portion of the casing and having a vertical shaft, an electric lamp located at the side of the casing, means for energizing the lamp including a generator actuated by the motor and disposed thereabove, a winding device comprising a winding shaft extending outwardly from the said shaft, gearing connecting the shafts, and means for operating the winding shaft having a reciprocatory member extending through the top of the casing.

2. In a portable device of the character described, the combination of a casing, a spring motor located within the casing and having a central vertical shaft, an electric lamp, means for energizing the lamp including a generator actuated by the motor, a winding device comprising a horizontal winding shaft extending outwardly from one end of the motor shaft to one side of the casing, gearing connecting the said shafts, and means for operating the winding shaft from the top of the casing.

3. In a portable device of the character described, the combination of a casing, an electric lamp, a spring motor in the lower part of the casing, means for energizing the lamp including a generator actuated by the motor and disposed in the upper part of the casing, a winding device comprising a winding shaft located above the motor and extending to one side of the casing, gearing connecting the winding shaft with the spring motor, and means for operating the winding shaft having a reciprocatory member extending through the top of the casing.

4. In a device of the class described, the combination of an outer casing, a spring motor comprising a plurality of superposed springs disposed in the lower part of said casing, an electric lamp disposed in the side of said casing, a plate transversely disposed in the casing above the motor, a motor shaft journaled in the plate, means operable from the outside of the casing for winding the motor, an electric generator disposed above the plate and within the casing and connected with said lamp, actuating means for driving the generator from the motor, a governor operative with said means to regulate the speed of the motor, and means operable from the outside of the casing for stopping and starting the motor through the medium of the governor.

Signed at Philadelphia, county of Philadelphia, State of Pennsylvania, the 21st day of June, 1920.

CARTER B. BURNET.